(No Model.) 2 Sheets—Sheet 1.

D. B. MERRELL.
MANURE SPREADER.

No. 531,206. Patented Dec. 18, 1894.

Witnesses
Willie H Tuttle
M. N. Clement

Inventor
Daniel B. Merrell
by Church & Church
his Attys (No Model.) 2 Sheets—Sheet 2.

D. B. MERRELL.
MANURE SPREADER.

No. 531,206. Patented Dec. 18, 1894.

Witnesses
Inventor
Daniel B. Merrell

THE NORRIS PETERS CO., PHOTO-LITHO., WASHINGTON, D. C.

UNITED STATES PATENT OFFICE.

DANIEL B. MERRELL, OF CANANDAIGUA, NEW YORK.

MANURE-SPREADER.

SPECIFICATION forming part of Letters Patent No. 531,206, dated December 18, 1894.

Application filed May 19, 1894. Serial No. 511,863. (No model.)

*To all whom it may concern:*

Be it known that I, DANIEL B. MERRELL, of Canandaigua, in the county of Ontario and State of New York, have invented certain new and useful Improvements in Manure-Spreaders; and I do hereby declare the following to be a full, clear, and exact description of the same, reference being had to the accompanying drawings, forming a part of this specification, and to the reference-numerals marked thereon.

My present invention relates to that class of manure spreaders such as are shown in my prior Patents Nos. 419,463 and 448,884, embodying two or more beaters or spreading devices located at the rear end of the body of the vehicle containing the manure, and a conveying device in said body and movable lengthwise thereof to carry the manure to the beaters by which it is cast from the rear end of the vehicle and spread upon the ground, and the invention has for its object to improve this class of machines, whereby the manure will be spread over a greater area and the parts are more easily operated and adjusted, and it consists in certain improvements, which will be hereinafter fully described and the novel features of which will be pointed out in the claims at the end of this specification.

Figure 1:
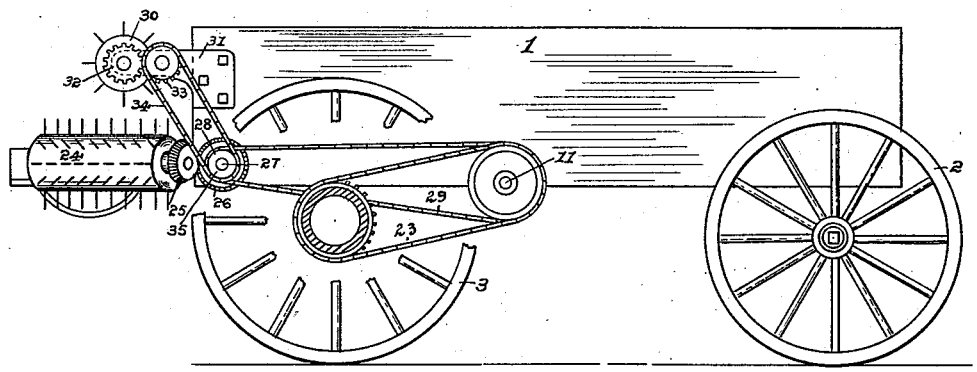
Figure 2:
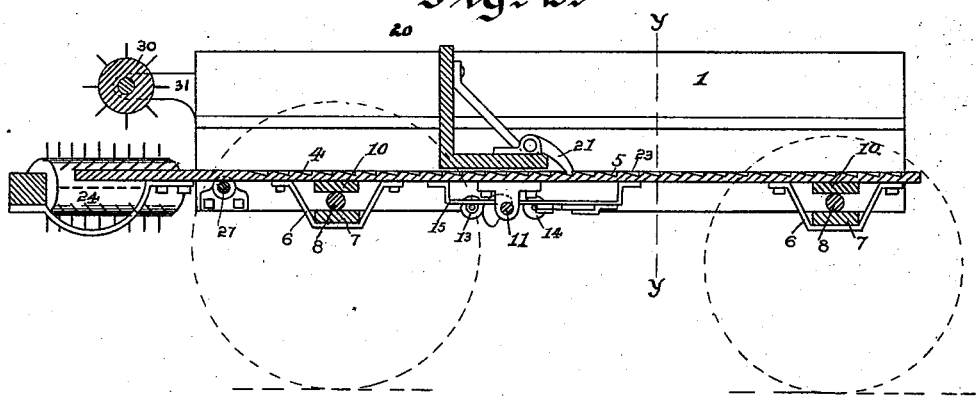
Figure 3:
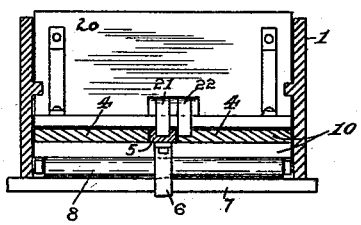
Figure 4:
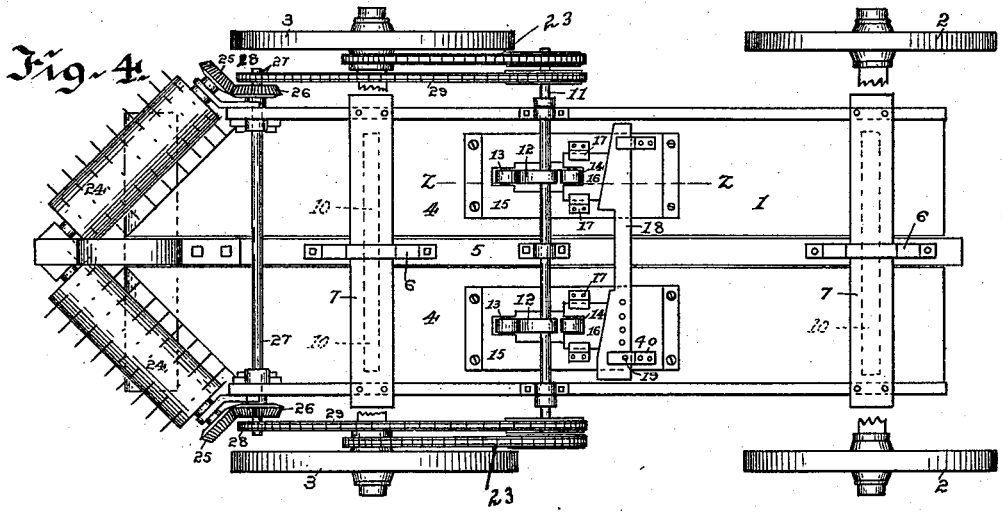
Figure 5:
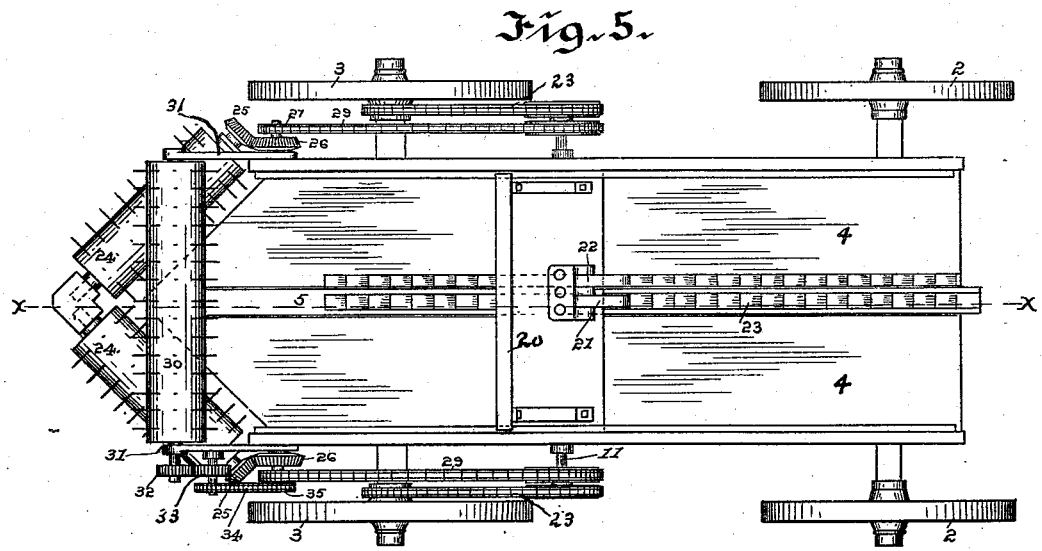
Figure 6:
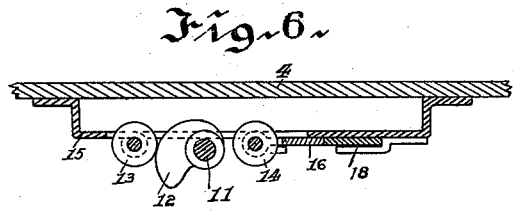

In the drawings: Figure 1 is a side elevation of a machine constructed in accordance with my present invention; Fig. 2, a longitudinal-sectional view taken on the line $x$—$x$ of Fig. 5; Fig. 3, a cross-sectional view on the line $y$—$y$ of Fig. 2; Fig. 4, a bottom plan view; Fig. 5, a top plan view; Fig. 6, a sectional view on the line $z$—$z$ of Fig. 4.

Similar reference-numerals in the several figures indicate similar parts.

1 indicates the wagon-body in which is carried the manure to be spread; 2, the forward supporting wheels, and 3, the rear supporting wheels.

The bottom or floor of the body is movable longitudinally and is preferably divided into two parts 4, 4, connected by strips 10, and between these parts is a longitudinal strip 5, which is stationary and secured to the body in any suitable manner, preferably by brackets 6 attached to the lower cross piece 7 to which latter are firmly bolted the sides 1.

The two longitudinal floor sections 4, 4, are supported in any suitable manner preferably upon rollers 8, as shown, and as contained in my prior patents, and their rear ends are beveled or cut away at an angle, as shown in Figs. 4 and 5.

Extending beneath the body of the vehicle preferably about midway of its length is a shaft 11 supported in suitable bearings on the sides and preferably at the center and provided with two cams 12, one arranged beneath each of the bottom sections 4 and adapted to engage with small rollers 13 and 14 in suitable frames 15 secured to the under sides of the floor sections 4. The rollers 14 are supported upon slides 16 held in place by suitable brackets 17 and having the inclined forward edges against which operate the correspondingly shaped edges of a slide 18 movable laterally of the vehicle and adapted to be secured by a pin 19 passing through a bracket 40 and through any one of a series of holes in said slide, as shown in Fig. 4. It will be seen that by adjusting said slide laterally the position of the frames carrying the rollers 14 may be changed and the space between said rollers and the rollers 13 may be varied as desired, so that when the shaft 11 is rotated the distance the floor sections 4 are moved back and forth may be varied. The rollers 13 and 14 are in effect abutments, and rollers are preferably employed to diminish friction.

20 indicates the end board or follower movable longitudinally of the vehicle body for the purpose of pushing the manure to the beaters at the end, and as in my previous patents, it is provided with two loose pawls 21 and 22, the former engaging with a ratchet bar 23 on the central strip 5, and the latter engaging a corresponding ratchet attached to one of the floor sections 4, as shown in Fig. 5, the operation being that when the floor sections are moved to the rear of the vehicle, the end board is carried by the pawl 22, and is retained by the pawl 21 when said sections move back.

The shaft 11 may be rotated, as shown in Fig. 4, from the rear wheels 3 by means of sprocket chains 23, suitable clutch devices, as shown in my prior patents, being arranged between the wheel and the shaft, or other driving mechanism could be employed.

Instead of employing the distributers or beaters extending transversely of the vehicle body as in my other patents, I arrange the two lower beaters 24 at approximately right angles to each other, as shown; said beaters consisting of rollers provided with suitable teeth or projections and supported in suitable boxes or bearings at their ends so that they may be freely rotated. The outer ends of the shafts of these beaters are provided with beveled gears 25 meshing with corresponding gears 26 on the ends of a shaft 27 beneath the vehicle body upon which shaft are sprocket wheels 28 driven by a chain 29 from corresponding sprocket wheels on the transverse shaft 11.

The upper beater 30 is substantially the same in construction as the lower one, but it extends transversely of the vehicle body and approximately in line with the centers of the lower beaters, and is supported to rotate in suitable brackets 31 attached to the ends of the vehicle sides, and upon its end is located a pinion 32 meshing with a corresponding pinion 33 connected with a sprocket, which latter is in turn driven by a chain 34 from the sprocket wheel 35, on the shaft 27. The gearing I have shown and described for driving these parts may be greatly varied without departing from the spirit of my invention.

It will be understood that the reciprocation of the bottom sections by the means described will cause the follower to press the manure to the rear where it will be broken up and prevented from caking by the beaters 24 and 30 and distributed by the former upon the ground being thrown outward at the sides thereby covering a greater area. I am enabled to carry the material clear to the apex of the triangle formed by the two lower beaters by means of the longitudinally movable floor sections, shaped at the ends to correspond approximately to the angles at which said beaters are arranged, and this without liability of the manure sifting through, thereby insuring its proper distribution.

The employment of means for varying the reciprocating motion of the bottom sections 4 is advantageous as the feed can be varied to suit the material being operated upon, and though I prefer to employ the rollers 13 and 14 to diminish friction they could be dispensed with, as stated, if desired.

I claim as my invention—

1. In a manure spreader, the combination with feeding devices, of the two beaters arranged at an angle to each other, and driving devices for rotating said beaters, substantially as described.

2. In a manure spreader, the combination with the reciprocating bottom having the pointed rear end, and a feeding device operated thereby, of the two rotary beaters at the rear of said bottom arranged at an angle to each other, substantially as described.

3. In a manure spreader, the combination with the two reciprocating bottom sections having the inclined rear ends the ratchet bar between them, one of said sections having a ratchet, and the follower having the two pawls, of the two rotary beaters at the rear, set at an angle to each other, substantially as described.

4. In a manure spreader, the combination with the body and feeding devices, of two lower rotary beaters arranged at an angle to each other and a transversely-extending rotary beater or spreader arranged over the two lower beaters, substantially as described.

5. In a manure spreader, the combination with the sides, and feeding devices, of the bottom having the stationary and the adjustable abutments, and the rotary cam arranged between them for causing the reciprocation of said bottom, substantially as described.

6. In a manure spreader, the combination with the reciprocating bottom composed of the two sections, one of them having the ratchet, the stationary ratchet between, and the movable follower having the pawls, of the rotary shaft having the cams, the stationary abutment on each of the bottom sections, the movable abutments and connections for simultaneously adjusting the latter, substantially as described.

7. In a manure spreader, the combination with the reciprocating bottom section, the stationary roller thereon, the adjustable slide having the inclined edge, and the roller, and the adjustable wedge engaging said slide, of the rotary shaft having the cam engaging the rollers, substantially as described.

DANIEL B. MERRELL.

Witnesses:
M. N. CLEMENT,
WILLIS H. TUTTLE.